(12) United States Patent
Siegmund et al.

(10) Patent No.: US 12,495,039 B2
(45) Date of Patent: Dec. 9, 2025

(54) INTEGRATED AUTHENTICATION SYSTEM AND METHOD

(71) Applicant: Schlumberger Technology Corporation, Sugar Land, TX (US)

(72) Inventors: Frederik Siegmund, Abingdon (GB); Rajkumar Kannan, Houston, TX (US); Waikhom Imocha Singh, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 183 days.

(21) Appl. No.: 17/906,866

(22) PCT Filed: Mar. 24, 2021

(86) PCT No.: PCT/US2021/023936
§ 371 (c)(1),
(2) Date: Sep. 21, 2022

(87) PCT Pub. No.: WO2021/195248
PCT Pub. Date: Sep. 30, 2021

(65) Prior Publication Data
US 2023/0126588 A1   Apr. 27, 2023

Related U.S. Application Data

(60) Provisional application No. 62/994,713, filed on Mar. 25, 2020.

(51) Int. Cl.
*H04L 9/40* (2022.01)
*H04L 67/141* (2022.01)

(52) U.S. Cl.
CPC ...... *H04L 63/0846* (2013.01); *H04L 63/0876* (2013.01); *H04L 67/141* (2013.01)

(58) Field of Classification Search
CPC ............. H04L 63/0846; H04L 63/0876; H04L 67/141; H04L 63/062; H04L 63/0815;
(Continued)

(56) References Cited

U.S. PATENT DOCUMENTS 8,800,009 B1 * 8/2014 Beda, III ............ H04L 63/0846
713/157
9,646,151 B2 * 5/2017 Miyakawa .............. G06F 21/31
(Continued)

FOREIGN PATENT DOCUMENTS

EP      2383956 A2    11/2011
JP    2014099030 A     5/2014
(Continued)

OTHER PUBLICATIONS

Search Report and Written Opinion of International Patent Application No. PCT/US2021/023936 dated Jul. 15, 2021, 8 pages.
(Continued)

*Primary Examiner* — Alexander Lagor
*Assistant Examiner* — Rupali Dhakad
(74) *Attorney, Agent, or Firm* — Jeffrey D. Frantz (57) ABSTRACT

A method may include sending, to a provisioning service and by an application executing on a virtual machine, a local authentication token for a user of the virtual machine. The provisioning service may use the local authentication token to generate a portable access token. The method may further include receiving, from the provisioning service, the portable access token, and launching, by the application and for the user, a session in a web service by sending the portable access token to an application programming interface (API) of the web service.

17 Claims, 6 Drawing Sheets

(58) Field of Classification Search
CPC ........... H04L 63/0838; H04L 2463/081; H04L 67/02; G06F 21/53; G06F 21/33
See application file for complete search history.

(56) References Cited

U.S. PATENT DOCUMENTS

| | | | |
|---|---|---|---|
| 9,838,430 B1 | 12/2017 | Roth | |
| 10,742,655 B2* | 8/2020 | Taylor | G06F 21/6209 |
| 11,190,514 B2* | 11/2021 | Dube | H04L 63/0807 |
| 11,757,635 B2* | 9/2023 | Muhanna | H04L 63/0823 |
| 11,941,643 B2* | 3/2024 | Rungta | G06Q 40/03 |
| 2012/0060210 A1* | 3/2012 | Baker | H04L 63/0807 |
| | | | 726/5 |
| 2012/0089833 A1 | 4/2012 | Jirka et al. | |
| 2014/0373126 A1* | 12/2014 | Hussain | H04L 63/0807 |
| | | | 726/9 |
| 2016/0036794 A1* | 2/2016 | Adhya | H04W 12/50 |
| | | | 726/4 |
| 2017/0149807 A1* | 5/2017 | Schilling | G06F 21/53 |
| 2017/0310771 A1* | 10/2017 | Lewis | H04L 63/102 |
| 2018/0060456 A1* | 3/2018 | Phatak | G06F 9/5077 |
| 2018/0123793 A1 | 5/2018 | Thibadeau, Sr. et al. | |
| 2019/0036901 A1 | 1/2019 | Brooker | |
| 2021/0288808 A1* | 9/2021 | Bahety | H04L 9/3247 |
| 2021/0344670 A1* | 11/2021 | Dachev | H04L 63/0846 |
| 2022/0239483 A1* | 7/2022 | Sugarev | H04L 9/3242 |

FOREIGN PATENT DOCUMENTS

| | | |
|---|---|---|
| JP | 2017188130 A | 10/2017 |
| WO | 2018118733 A2 | 6/2018 |

OTHER PUBLICATIONS

International Preliminary Report on Patentability of International Patent Application No. PCT/US2021/023936 dated Oct. 6, 2022, 5 pages.
Extended Search Report issued in European Patent Application No. 21775948.9 dated Feb. 27, 2024, 10 pages.

* cited by examiner

INTEGRATED AUTHENTICATION SYSTEM AND METHOD

CROSS-REFERENCE TO RELATED APPLICATION

This application is a National Stage Entry of International Patent Application No. PCT/US2021/023936, filed on Mar. 21, 2021, which claims priority to U.S. Provisional Patent Application Ser. No. 62/994,713, filed on Mar. 25, 2020, having the same inventors, and entitled "ENGINE ECOSYSTEM INTEGRATION," incorporated herein by reference in its entirety.

BACKGROUND

With conventional systems, a user seeking to launch a web service from an application executing on a virtual machine is required to provide detailed configuration and/or security information to the web service and/or various security layers. For example, the web service may be a simulation tool and the user may be executing an application running on a virtual machine provisioned by a cloud computing service. The application executing in the virtual machine may remote access the web service.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including sending, to a provisioning service and by an application executing on a virtual machine, a local authentication token for a user of the virtual machine. The provisioning service uses the local authentication token to generate a portable access token. The method further includes receiving, from the provisioning service, the SUBSTITUTE SHEET (RULE 26) portable access token, and launching, by the application and for the user, a session in a web service by sending the portable access token to an application programming interface (API) of the web service. Other aspects of the disclosure will be apparent from the following description and the appended claims.

BRIEF DESCRIPTION OF DRAWINGS

FIG. 3.1 and FIG. 3.2 show flowcharts in accordance with one or more embodiments.

FIGS. 5.1 and 5.2 show diagrams of a computing system in accordance with one or more embodiments.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to integrated authentication for a web service and an application executing on a virtual machine. Specifically, users remotely access the virtual machine and an application in the virtual machine remotely accesses the web service. A challenge exists in satisfying the different authentication requirements of the web service and virtual machine. For example, the web service may have a greater rate of reauthentication than the virtual machine. One or more embodiments provide a seamless authentication to the web service via the virtual machine.

Once a user logs into the virtual machine, an automated integrated authentication method manages handshakes among the virtual machine, the web service, and a provisioning service, enabling the user to seamlessly launch a session in the web service from the application. Thus, the user is freed from the overhead of managing layers of authentication among the virtual machine, the web service, and/or the provisioning service.

The provisioning service includes functionality to generate the virtual machine for the user. The provisioning service further includes functionality to generate a local authentication token enabling the user to access the virtual machine, and to exchange the local authentication token for a portable access token enabling the application to launch the session in the web service. The local authentication token is exchanged for the portable access token because the scope of the local authentication token is limited to the virtual machine, while the portable access token is represented using a standard format recognizable by the web service.

Figure 1:
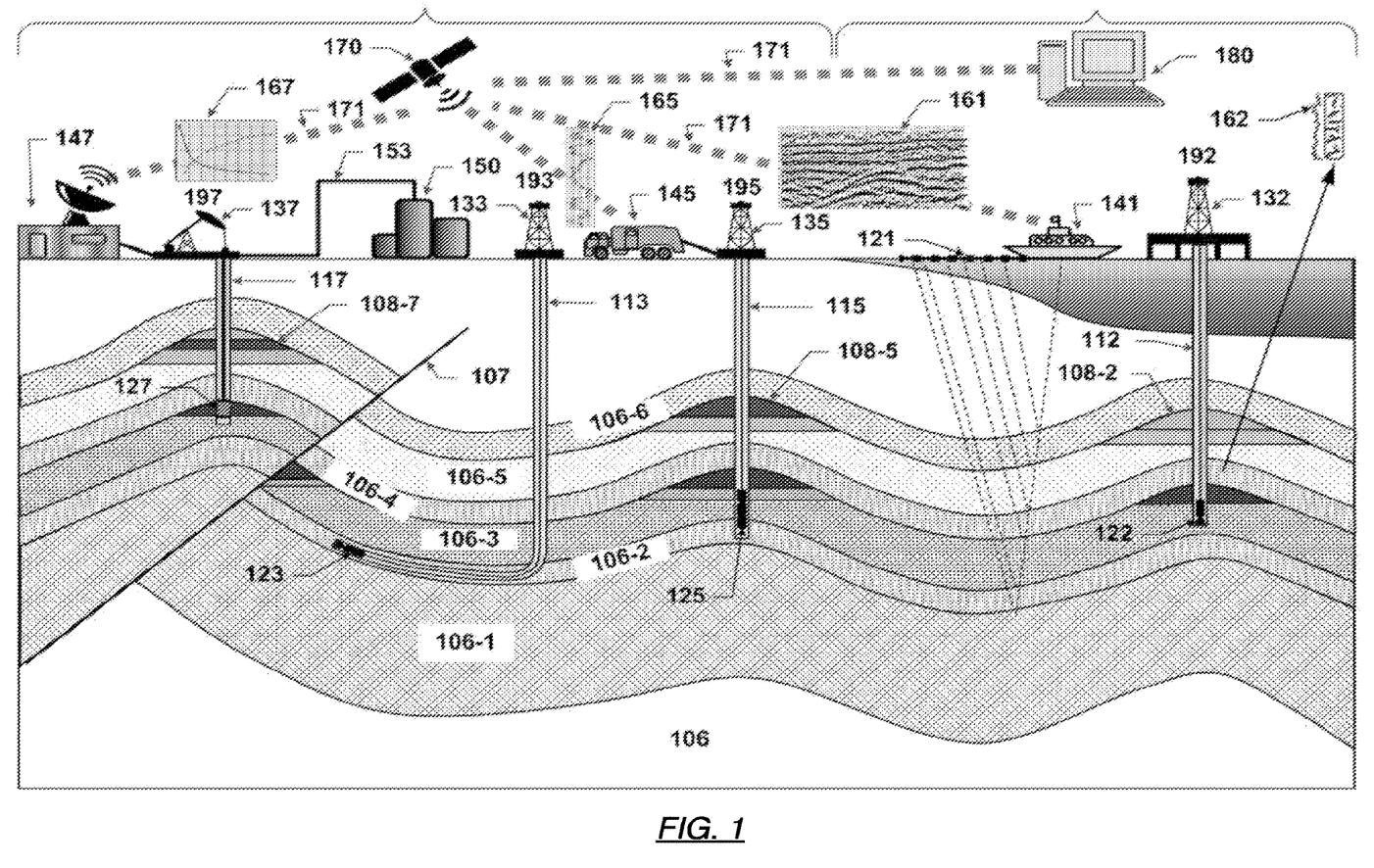
FIG. 1 shows a diagram of a field in accordance with one or more embodiments.

In one or more embodiments, the web service is a simulation program or modeling program. For example, the program may be configured to simulate or model a portion of an oilfield. FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

Figure 51:
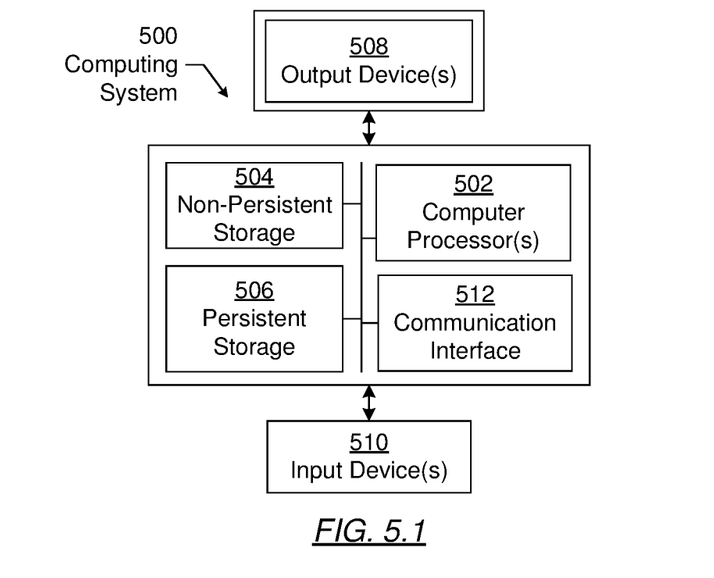
Figure 52:
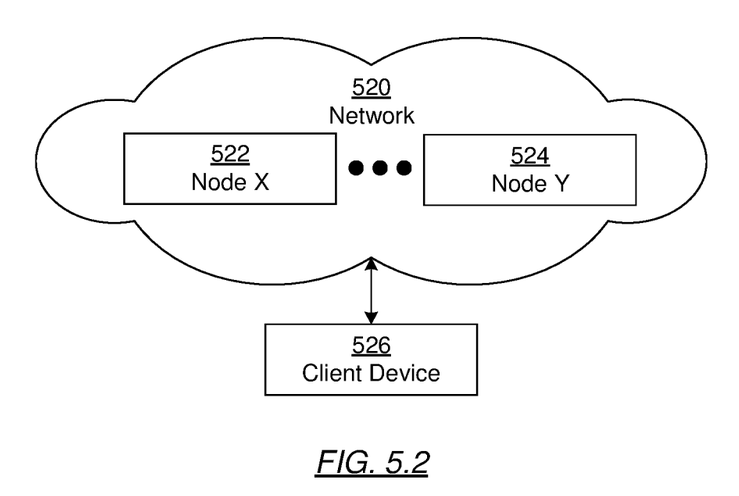

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

Figure 2:
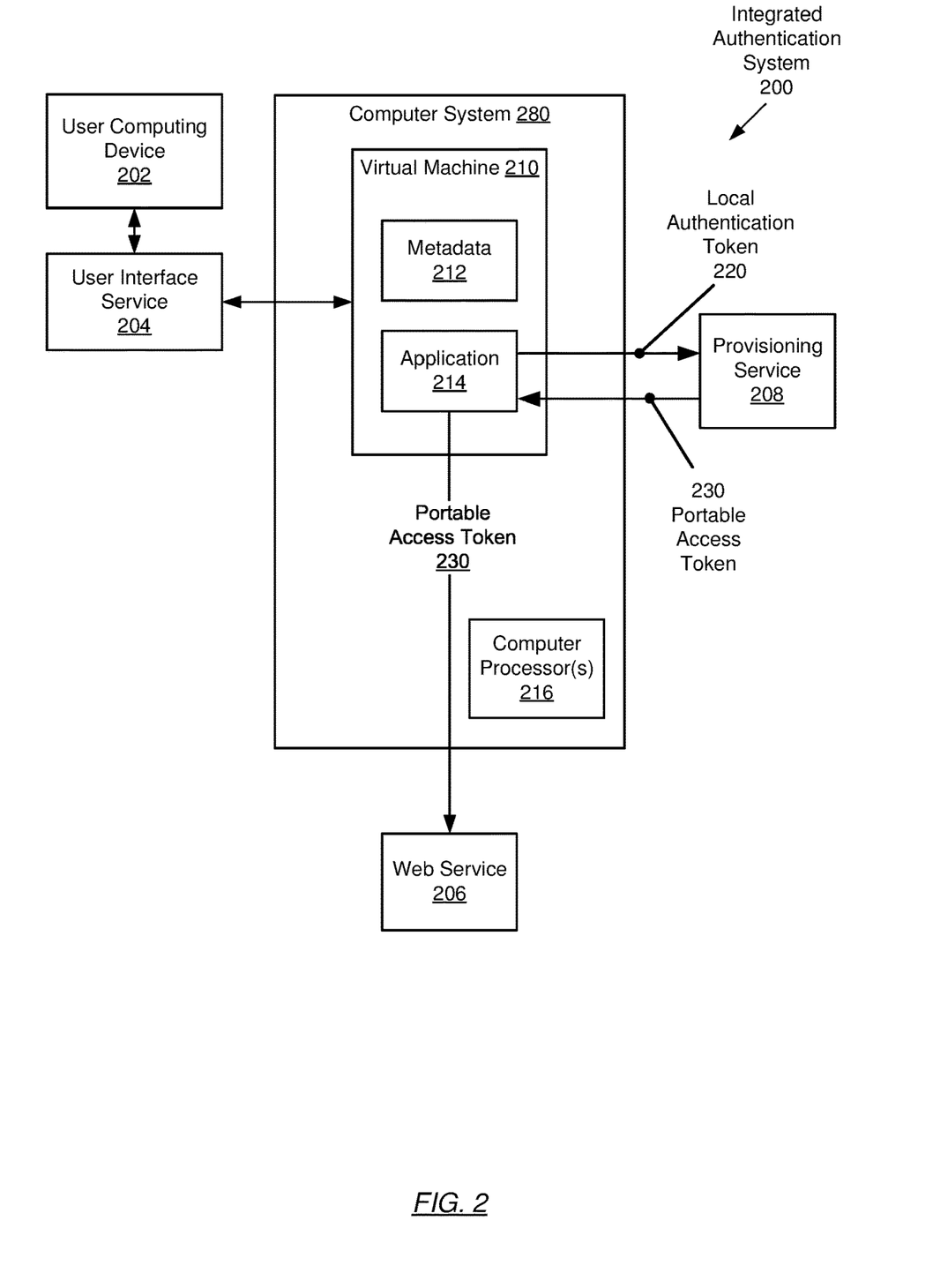
FIG. 2 shows a diagram of a system in accordance with one or more embodiments.

FIG. 2 shows a diagram of an integrated authentication system (200) in accordance with one or more embodiments. As shown in FIG. 2, the integrated authentication system (200) includes multiple components, such as a user computing device (202), a user interface service (204), a computer system (280), a web service (206), and a provisioning service (208). Each of these components is described below.

The computer system (280) may correspond to the computing system of FIGS. 5.1 and 5.2. The computer system (280) includes functionality to execute one or more virtual machines (210) using computer processor(s) (216). The computer system (280) may be executed on a computing system (500) shown in FIG. 5.1 connected to a network (520) as shown in FIG. 5.2. In one or more embodiments, the computer processor(s) (216) takes the form of the computer processor(s) (502) described with respect to FIG. 5.1 and the accompanying description below.

A virtual machine is a software implementation of a computing device executing on an underlying computing device (e.g., computing system (500)). A virtual machine may abstract the operating system and hardware of the underlying computing device from instructions that are executed in the virtual machine. The computer processor (216) includes functionality to execute the virtual machine (210).

The virtual machine (210) includes functionality to generate a local authentication token (220) for the user. The local authentication token (220) is a data structure that stores a credential to access the resources of the virtual machine (210). For example, the local authentication token (220) enables the user to access one or more applications (214) executing on the virtual machine (210). The local authentication token (220) may be represented in a format that is specific to the virtual machine (210). For example, the format may be an encrypted string including identifying information about the user. The local authentication token (220) has a scope restricted to accessing resources executing in the virtual machine (210). The virtual machine (210) may generate the local authentication token (220) for the user when the user successfully logs into the virtual machine (210).

A web service (206) may be any software application accessible over a network. As an example, the web service (206) may be a simulation or modeling tool. The web service (206) may provide one or more application programming interfaces (APIs) to control and/or inspect the execution of the web service (206). An API of the web service (206) may provide a status of the web service (206) via a graphical user interface (GUI) and/or a command line interface (CLI) of the web service (206). Continuing the above example, the status of a simulation tool may include a state of a simulation executed by the simulation tool. The API of the web service (206) may permit an application (214) to manage processor and/or storage resources used by the web service (206). For example, the user may increase the computing resources allocated to a simulation executed by the web service (206) to reduce compute time.

The virtual machine (210) includes functionality to store metadata (212). The metadata (212) includes a uniform resource locator (URL) at which the API of the web service (206) may be invoked. The metadata (212) may further include a secure (e.g., encrypted) string to be authenticated by the web service (206), as described in Block 358 below. The metadata (212) may be stored in an environment variable of the virtual machine (210).

An application (214) is a collection of computer instructions (e.g., statements) written in a human-readable programming language, or intermediate representation (e.g., byte code). The application (214) includes functionality to launch a web service (206). For example, the application (214) may invoke the web service (206) at an API of the web service (206). The application (214) includes functionality to provide a portable access token (230) to the web service (206) in order to gain access to the web service (206). The portable access token (230) is a data structure that stores information at least used for authentication to the web service. The portable access token (230) may have a standard format. For example, the standard format may be the JavaScript Object Notation (JSON) Web Token (JWT) format. The portable access token (230) has a limited period in which the portable access token is valid. In one or more embodiments, the limited period of the portable access token is less than the limited period of validity for the local authentication token and the refresh token, which may or may not be the same. Because the portable access token is valid for less time than the local authentication token and the refresh token, the portable access token is a short duration token. For example, the portable access token (230) may include an expiration time that is one hour after a current time of day. As a security measure, the portable access token (230) may include a digital signature (e.g., as an indication of the validity of the portable access token (230)).

The user computing device (202) may be executed on a computing system (500) shown in FIG. 5.1 connected to a network (520) as shown in FIG. 5.2. The user computing device (202) includes functionality to send login credentials of a user to the user interface service (204). For example, the login credentials may correspond to an account of the user on the virtual machine (210). The user computing device (202) provides, to a user, a variety of computing functionality. The user computing device (202) may be a mobile device (e.g., phone, tablet, digital assistant, laptop, etc.) or any other computing device (e.g., desktop, terminal, workstation, etc.) with a computer processor (not shown) and memory (not shown) capable of running computer software.

The user interface service (204) may be executed on a computing system (500) shown in FIG. 5.1 connected to a network (520) as shown in FIG. 5.2. The user interface service (204) includes functionality to validate login credentials of a user received from the user computing device (202). The user interface service (204) includes functionality to generate a refresh token from the login credentials. The refresh token is a data structure storing a credential that is used to acquire a new token. The refresh token may be used by the provisioning service (208) to generate a new portable access token (230). The provisioning service (208) may request the portable access token (230) from a token service, where the provisioning service (208) provides the refresh token. Alternatively or additionally, the refresh token may be used to refresh an existing token. For example, the refresh token may be used to generate a new portable access token (230) with a later expiration time, as described in Block 302 below. The refresh token is a long duration token. For example, the refresh token may include an expiration time that is several months after a current date (e.g., the date the refresh token was created). The refresh token may include information about the user. For example, the information about the user may include attributes (e.g., email address, user ID, etc.) used to identify and/or authenticate the user. The user interface service (204) includes functionality to send the refresh token to the provisioning service (208). The provisioning service (208) includes functionality to store the refresh token.

Continuing with FIG. 2, the application (214) includes functionality to send the local authentication token (220) to the provisioning service (208). The provisioning service (208) includes functionality to generate the portable access token (230) from the local authentication token (220). The provisioning service (208) includes functionality to send the portable access token (230) to the application (214).

The provisioning service (208) may be executed on a computing system (500) shown in FIG. 5.1 connected to a network (520) as shown in FIG. 5.2. The provisioning service (208) includes functionality to generate a virtual machine (210) for the user. The provisioning service (208) includes functionality to allocate computing resources (e.g., physical storage) to support the virtual machine (210). The computing resources may be provided by a public computing cloud service (e.g., Amazon Web Services (AWS), Egnyte, Azure, Google Cloud, etc.). The E&P computer system (180) may access the virtual machine (210) via a browser running on the E&P computer system (180). For example, the browser may access the virtual machine (210) via a remote desktop application.

The various credentials described above and in FIG. 2 may be user identifiers, encrypted passcodes, one-time codes, and/or other information used to authenticate a user and/or validate an access request.

While FIG. 2 shows a configuration of components, other configurations may be used without departing from the scope of the disclosure. The system may include multiple web services and users. For example, although FIG. 2 shows a single web service, the virtual machine may be connected to multiple web services. Each web service may have a corresponding portable access token. Further, an individual portable access token may exist for each user or group of users. Similarly, multiple provisioning services and virtual machines may exist. Separate provisioning services may exist for different web services, groups of users or virtual machines, etc. Other configurations may also exist. For example, the functionality performed by a single component may be performed by two or more components.

Figure 31:
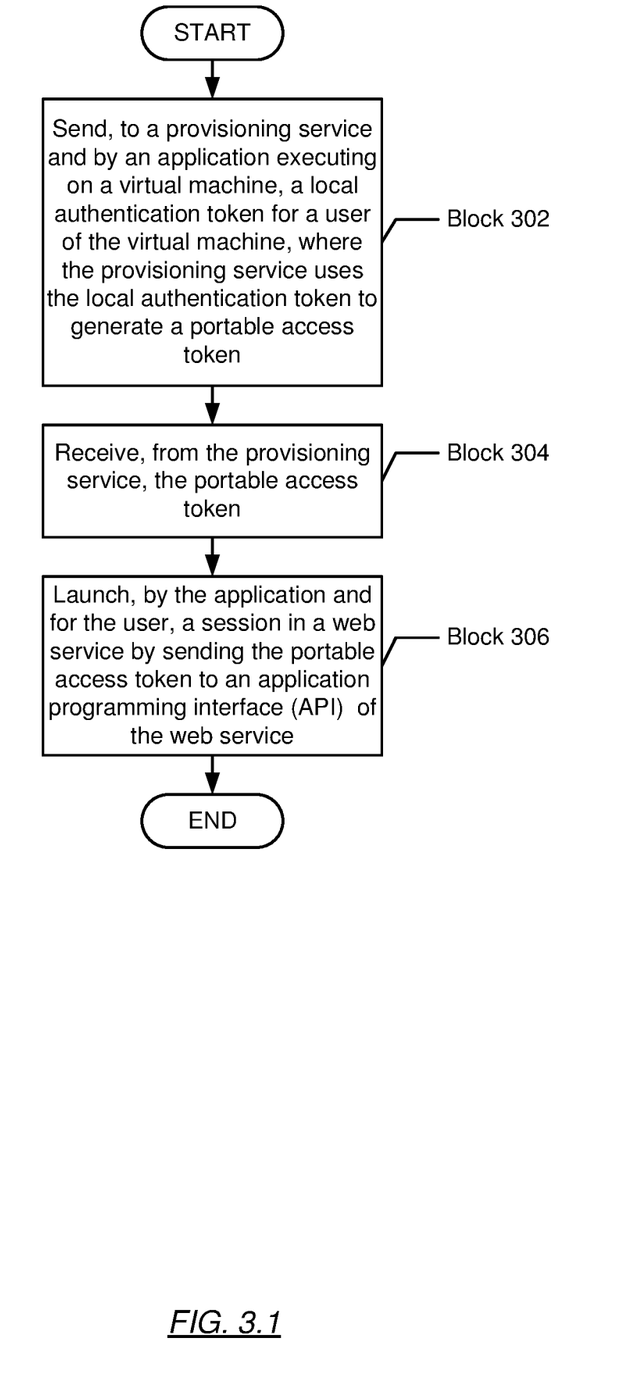

FIG. 3.1 shows a flowchart in accordance with one or more embodiments of the disclosure. The flowchart depicts a process for integrating a web service with an application executing on a virtual machine. One or more of the blocks in FIG. 3.1 may be performed by the components (e.g., the virtual machine (210), provisioning service (208) and/or web service (206) of the integrated authentication system (200)), discussed above in reference to FIG. 2. In one or more embodiments of the disclosure, one or more of the steps shown in FIG. 3.1 may be omitted, repeated, and/or performed in parallel, or in a different order than the order shown in FIG. 3.1. Accordingly, the scope of the disclosure should not be considered limited to the specific arrangement of steps shown in FIG. 3.1.

Initially, in Block 302, a local authentication token for a user of a virtual machine is sent to a provisioning service by an application executing on the virtual machine. The application sends the local authentication token to the provisioning service in order to exchange the local authentication token for a portable access token that is represented in a format recognizable by the web service (see description of Block 306 below). In contrast, the scope of the local authentication token is limited to the virtual machine. The provisioning service uses the local authentication token to generate the portable access token. Before generating the portable access token, the provisioning service may authenticate the virtual machine. For example, the provisioning service may check the validity of an Internet Protocol (IP) address of the virtual machine. In other words, the provisioning service may validate that the request for the portable access token is being issued from within the authorized virtual machine, in order to prevent the granting of a request for the portable access token that was issued external to the authorized virtual machine context. Additionally or alternatively, the provisioning service may validate that the information included in the local authentication token matches the information included in a refresh token stored by the provisioning service (see description of Block 352 below). For example, successfully matching the information included in the local authentication token and the information included in the refresh token may indicate that the user currently has a valid subscription to the virtual machine. Continuing this example, the provisioning service may validate that the name of the user and/or a security signature included in the local authentication token matches the name of the user and/or a security signature included in the refresh token.

When the current time is within a threshold of the expiration time of the portable access token, the application may send the portable access token to the provisioning service in order to exchange the portable access token for a new portable access token that has a later expiration time.

In Block 304, the portable access token is received from the provisioning service. The portable access token may be received by the application over a network (e.g., the internet).

In Block 306, a session in a web service is launched by the application and for the user by sending the portable access token to an application programming interface (API) of the web service. The application may further send metadata to the web service. The web service may authenticate the application using the portable access token and/or the metadata (see description of Block 358 below).

Figure 32:
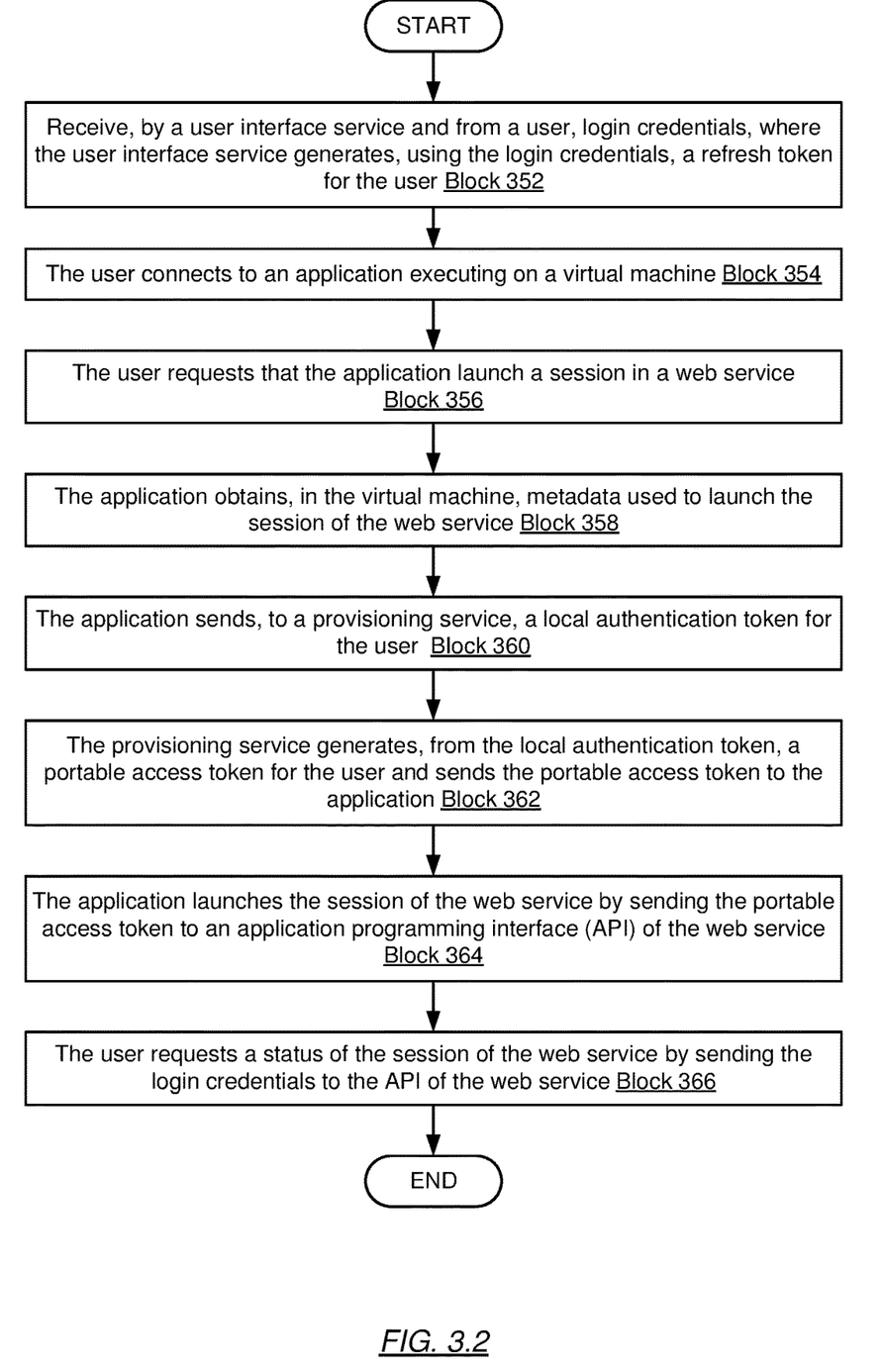

FIG. 3.2 shows a flowchart in accordance with one or more embodiments of the disclosure. The flowchart depicts a process for integrating a web service with an application executing on a virtual machine. FIG. 3.2 provides additional context and detail to the blocks performed in FIG. 3.1. One or more of the blocks in FIG. 3.2 may be performed by the components (e.g., the virtual machine (210), provisioning service (208), user interface service (204) and/or web service (206) of the integrated authentication system (200)), discussed above in reference to FIG. 2. In one or more embodiments of the disclosure, one or more of the steps shown in FIG. 3.2 may be omitted, repeated, and/or performed in parallel, or in a different order than the order shown in FIG. 3.2. Accordingly, the scope of the disclosure should not be considered limited to the specific arrangement of steps shown in FIG. 3.2.

Initially, in Block 352, login credentials are received from a user by a user interface service. The login credentials may be received by the user interface service over a network. The user interface service generates, using the login credentials, a refresh token for the user. For example, the user interface service may set the expiration time of the refresh token to be several months after a current date. The user interface service sends, to the provisioning service, the refresh token for the user. The provisioning service generates the virtual machine for the user using the refresh token. The provisioning service may store the refresh token in order to compare the refresh token with a subsequently received local authentication token or portable access token (see description of Block 302 above). Block 352 corresponds to the circle labeled "1" in FIG. 4.

In Block 354, the user connects to an application executing on the virtual machine. The user may login to the virtual machine using a remote desktop protocol. The connection to the virtual machine may be implemented using a browser executing on the user computing device. After a successful login to the virtual machine by the user, the virtual machine may generate a local authentication token for the user. Block 354 corresponds to the circle labeled "2" in FIG. 4.

In Block 356, the user requests that the application launch a session in a web service. The user's request triggers the process of FIG. 3.1 to automate the transmission, generation and/or validation of local and/or portable access tokens in order to launch the session in the web service on behalf of the user. Block 356 corresponds to the circle labeled "3" in FIG. 4.

In Block 358, the application obtains, in the virtual machine, metadata used to launch the session in the web service. The metadata may include the URL of the API of the web service. The metadata may further include a secure (e.g., encrypted) string used by the web service to authenticate the virtual machine. The application may send the secure string to the web service at the URL of the API of the web service. For example, the secure string, when successfully decrypted by the web service, may be interpreted as evidence that the virtual machine is authorized to launch a session in the web service. Block 358 corresponds to the circle labeled "4" in FIG. 4.

In Block 360, the application sends, to a provisioning service, the local authentication token for the user (see description of Block 302 above). Block 360 corresponds to the circle labeled "5" in FIG. 4.

In Block 362, the provisioning service generates, from the local authentication token, a portable access token for the user and sends the portable access token to the application (see description of Block 302 and Block 304 above). Block 362 corresponds to the circle labeled "6" in FIG. 4.

In Block 364, the application launches the session in the web service by sending the portable access token to an application programming interface (API) of the web service (see description of Block 306 above). Block 364 corresponds to the circle labeled "7" in FIG. 4.

In Block 366, the user requests a status of the session of the web service by sending the login credentials to the API of the web service. The web service may send, to the user and via the API of the web service, the status of the session in the web service. The user may receive the status of the session of the web service via a user interface provided by the web service. Block 366 corresponds to the circle labeled "8" in FIG. 4.

Thus the integrated authentication system provides a single sign-on capability to the user, where the user may obtain the status of the session of the web service by providing the user's login credentials to the web service. In other words, the generation and transmission of the various tokens (e.g., the refresh token, local authentication token, and portable access token) occurs without any additional input from the user.

Figure 4:
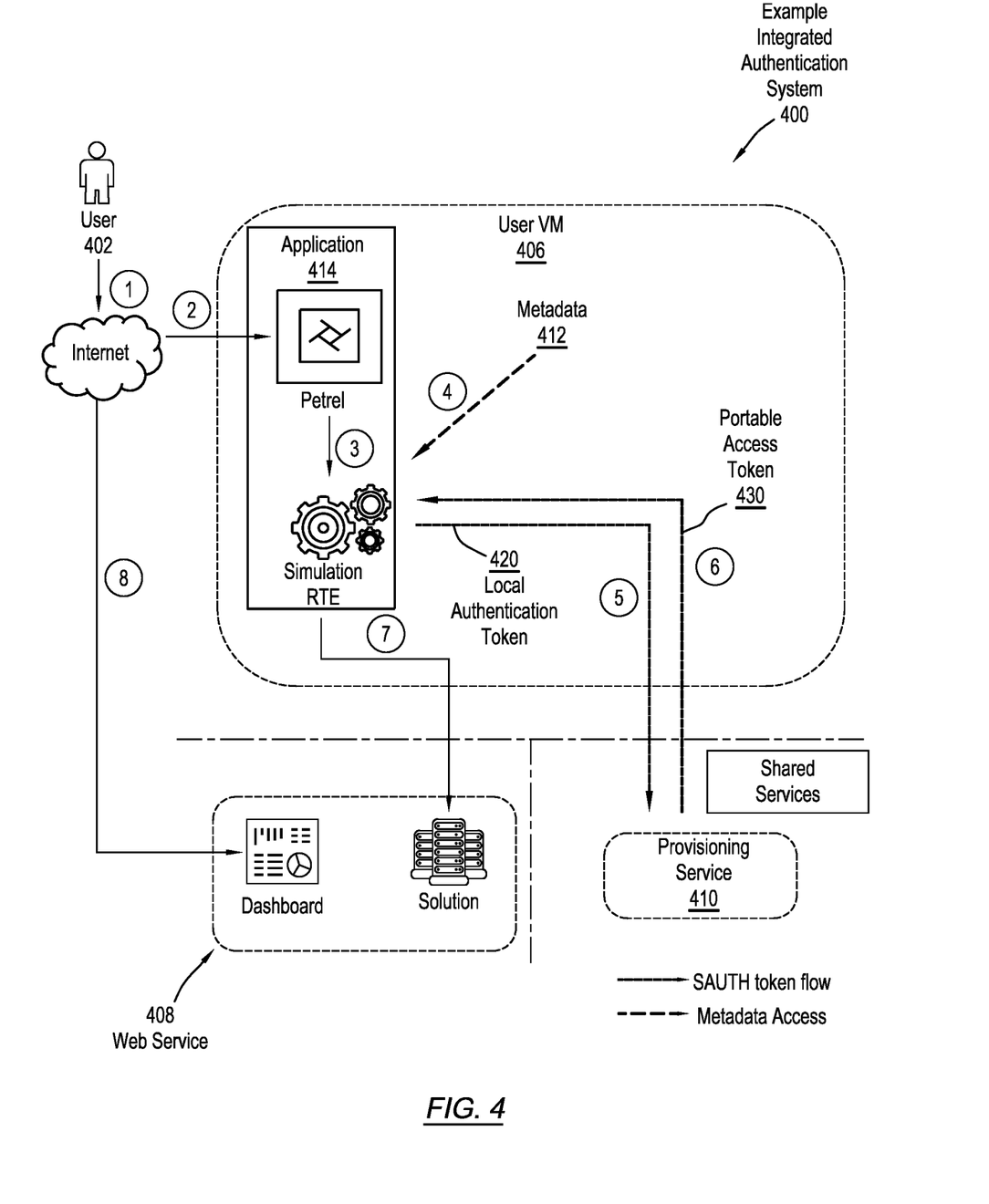
FIG. 4 shows an example in accordance with one or more embodiments.

FIG. 4 shows an implementation example in accordance with one or more embodiments. The implementation example is for explanatory purposes and not intended to limit the scope of the disclosure. One skilled in the art will appreciate that implementation of embodiments of the disclosure may take various forms and still be within the scope of the disclosure. The discussion below of FIG. 4 refers to the Blocks shown in FIGS. 3.1 and 3.2. The reference to the Blocks is for example purposes and is not intended to limit the scope of the claims to the example or the operations of the Blocks to the example operations presented below.

In particular, FIG. 4 shows an example integrated authentication system (400) ((200) in FIG. 2). The example integrated authentication system (400) includes a user (402) of a user computing device, a user virtual machine (VM) (406) ((210) in FIG. 2), a web service (408) ((206) in FIG. 2), and a provisioning service (410) ((208) in FIG. 2). In this example, the web service (408) is a simulation tool used by oil and gas applications. As described below, FIG. 4 shows which elements of the example integrated authentication system (400) perform Blocks 352 thru 366 of FIG. 3.2.

The circle labeled "1" corresponds to Block 352 and indicates that the user (402) provides login credentials to the user interface service. The circle labeled "2" corresponds to Block 354 and indicates that the user computing device connects to an application (414) ((214) in FIG. 2) executing on the user VM (406). The application (414) includes an oil and gas application and a simulation runtime environment to communicate with the web service (408). The circle labeled "3" corresponds to Block 356 and indicates that the application (414) has requested, on behalf of the user (402), the launch of a session in the web service (408). The session corresponds to a simulation executing in the simulation tool. The circle labeled "4" corresponds to Block 358 and indicates that the application (414) obtains metadata (412) in the user VM (406) used to launch the session in the web service (408). The metadata (412) includes the URL of an application programming interface (API) of the web service (408) as well as an encrypted string that the web service (408) decrypts to authenticate the user VM (406). The circle labeled "5" corresponds to Block 360 and indicates that the application (414) sends a local authentication token (420) to the provisioning service (410). The circle labeled "6" corresponds to Block 362 and indicates that the provisioning service (410) generates a portable access token (430) from the local authentication token (420), and then sends the portable access token (430) to the application (414). The circle labeled "7" corresponds to Block 364 and indicates that the application (414) launches the session in the web service (408) by sending the portable access token (430) to the API of the web service (408). The circle labeled "8" corresponds to Block 366 and indicates that the user (402) requests a status of the simulation executing at the web service (408) by sending the login credentials to the API of the web service (408). The user (402) accesses the status via a "dashboard" of the web service (408).

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). A node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where a portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
receiving, by a user interface service and from a user, login credentials;
generating, by the user interface service and using the login credentials, a refresh token for the user;
sending, to a provisioning service and by an application executing on a virtual machine comprising instructions stored on a non-transitory computer readable medium and executed by a processor, a local authentication token for the user of the virtual machine, wherein the provisioning service uses the local authentication token to generate a portable access token;
receiving, from the provisioning service, the portable access token;
launching, by the application and for the user, a session in a web service by sending the portable access token to an application programming interface (API) of the web service; and
sending, by the user interface service and to the provisioning service, the refresh token for the user, wherein the provisioning service generates the virtual machine using the refresh token and validates first information included in the local authentication token as matching second information in the refresh token in generating the portable access token, wherein the portable access token comprises a data structure that stores information used for authentication to the web service, and wherein the portable access token has a first period of validity and a digital signature, wherein the first period of validity is less than a second period of validity of the local authentication token and a third period of validity of the refresh token, wherein the second period of validity of the local authentication token and the third period of validity of the refresh token comprise different periods of validity with respect to one another.

2. The method of claim 1, further comprising:
receiving, from the user and by the API of the web service, the login credentials and a request for a status of the session in the web service; and
sending, to the user and by the API of the web service, the status of the session in the web service.

3. The method of claim 2, wherein the web service is a simulation tool, wherein the simulation tool executes a simulation for the user, and wherein the status comprises a state of the simulation.

4. The method of claim 1, further comprising:
sending, to the provisioning service, a request to generate a new portable access token with a new expiration time when an expiration time of the portable access token is within a threshold of a current time, wherein the provisioning service generates the new portable access token; and
receiving, from the provisioning service, the new portable access token.

5. The method of claim 4, wherein the provisioning service further:
in response to receiving the request from the application to update the portable access token, validates an Internet Protocol (IP) address of the virtual machine.

6. The method of claim 1, further comprising:
obtaining, by the application, a URL of the API from metadata stored in the virtual machine, wherein the session is launched using the URL of the API.

7. The method of claim 1, wherein the local authentication token has a scope restricted to accessing resources within the virtual machine.

8. The method of claim 1, wherein the provisioning service further:
generates the portable access token using metadata stored in the virtual machine, wherein the metadata comprises information that authenticates the virtual machine to the web service.

9. A system comprising:
a computer processor;
a non-transitory computer readable medium coupled to the computer processor;
a virtual machine comprising instructions stored on the non-transitory computer readable medium and executing on the computer processor;
an application executing on the virtual machine and configured to:
send, to a provisioning service, a local authentication token for a user of the virtual machine,
receive, from the provisioning service, a portable access token, and
launch, for the user, a session in a web service by sending the portable access token to an application programming interface (API) of the web service; and
a user interface service configured to:
receive, from the user, login credentials,
generate, using the login credentials, a refresh token for the user; and
send, to the provisioning service, the refresh token for the user;
the provisioning service configured to:
generate, from the local authentication token, the portable access token;
generate, using the refresh token for the user, the virtual machine; and
validate first information included in the local authentication token as matching second information in the refresh token in generating the portable access token, wherein the portable access token comprises a data structure that stores information used for authentication to the web service, and wherein the portable access token has a first period of validity and a digital signature, wherein the first period of validity is less than a second period of validity of the local authentication token and a third period of validity of the refresh token, wherein the second period of validity of the local authentication token and the third period of validity of the refresh token comprise different periods of validity with respect to one another.

10. The system of claim 9, wherein the web service is configured to:
receive, from the user and by the API of the web service, the login credentials and a request for a status of the session in the web service, and
send, to the user and by the API of the web service, the status of the session in the web service.

11. The system of claim 10, wherein the web service is a simulation tool, wherein the simulation tool executes a simulation for the user, and wherein the status comprises a state of the simulation.

12. The system of claim 9, wherein the provisioning service is further configured to:
receive a request from the application to generate a new portable access token with a new expiration time when an expiration time of the portable access token is within a threshold of a current time, generate the new portable access token, and send, to the application, the new portable access token.

13. The system of claim 10, wherein the provisioning service is further configured to:

in response to receiving the request from the application to update the portable access token, validate an Internet Protocol (IP) address of the virtual machine.

14. The system of claim 9, wherein the application is further configured to:

obtain a URL of the API from metadata stored in the virtual machine, wherein the session is launched using the URL of the API.

15. The system of claim 9, wherein the local authentication token has a scope restricted to accessing resources within the virtual machine.

16. The system of claim 9, wherein the provisioning service is further configured to:

generate the local authentication token using metadata stored in the virtual machine, wherein the metadata comprises information that authenticates the virtual machine to the web service.

17. A non-transitory computer readable medium comprising instructions that, when executed by a virtual machine executing on a computer processor, perform operations comprising:

sending, to a provisioning service and by an application executing on the virtual machine, a local authentication token for a user of the virtual machine, wherein the provisioning service uses the local authentication token to generate a portable access token;

receiving, from the provisioning service, the portable access token; and launching, by the application and for the user, a session in a web service by sending the portable access token to an application programming interface (API) of the web service, wherein the provisioning service further:

receives a refresh token for the user;

generates, using the refresh token for the user, the virtual machine; and validates first information included in the local authentication token as matching second information in the refresh token in generating the portable access token, wherein the portable access token comprises a data structure that stores information used for authentication to the web service, and wherein the portable access token has a first period of validity and a digital signature, wherein the first period of validity is less than a second period of validity of the local authentication token and a third period of validity of the refresh token, wherein the second period of validity of the local authentication token and the third period of validity of the refresh token comprise different periods of validity with respect to one another.

* * * * *